March 4, 1924.

L. BROWN

FOCUSING SYSTEM FOR CAMERAS

Filed May 24, 1921

Inventor:
Lloyd Brown
by James T. Batchelor
his Attorney

March 4, 1924.

L. BROWN

FOCUSING SYSTEM FOR CAMERAS

Filed May 24, 1921

Inventor:
Lloyd Brown
by James T. Batchelder
his Attorney

March 4, 1924.

L. BROWN 1,485,908

FOCUSING SYSTEM FOR CAMERAS

Filed May 24, 1921    4 Sheets-Sheet 4

Inventor:
Lloyd Brown,
by James T. Buckelew
his Attorney.

Patented Mar. 4, 1924.

1,485,908

UNITED STATES PATENT OFFICE.

LLOYD BROWN, OF LOS ANGELES, CALIFORNIA, ASSIGNOR TO HIMSELF AND C. B. HURTT, TRUSTEES.

FOCUSING SYSTEM FOR CAMERAS.

Application filed May 24, 1921. Serial No. 472,195.

*To all whom it may concern:*

Be it known that I, LLOYD BROWN, a citizen of the United States, residing at Los Angeles, in the county of Los Angeles and State of California, have invented new and useful Improvements in Focusing Systems for Cameras; and the following is such a full, clear, and exact disclosure of the manner of constructing and operating my invention that anyone skilled in the art to which it appertains may make and use the same.

This invention pertains to focusing apparatus for cameras, and the like, and has particular reference to devices of that class adapted for use in connection with motion picture cameras. In its present embodiment it is similar to my invention of a device of the same general character, shown and described in my application for United States Letters Patent on focusing apparatus for cameras, filed May 24th, 1921, Serial No. 472,194.

My foremost object in perfecting this invention was to provide a focusing mechanism which could be incorporated in a motion picture camera of the usual construction; whereby the object being photographed could be projected directly through the exposure aperture onto a ground glass and be viewed by the operator in the exact proportions in which it is impressed upon the film.

A further object was the arrangement of such a device within the camera case in such a manner that it may be used at any time during the photographing of a picture, to observe the lighting effects, etc., without entirely displacing the film from its actuating mechanism and without danger of subjecting it to an injurious exposure to light.

These objects I have attained by mounting an adjustable focusing tube within the camera case, and making it adjustable in and out of operative position from the exterior thereof; and also by providing a peep-hole cover, and a locking means therefor, whereby the cover cannot be opened unless the focusing tube is in operative position, and the tube cannot be moved out of operative position until the cover is again over the peep-hole.

These functions are further made possible by my construction and arrangement of the film raceway and aperture gate, also operable from the exterior of the camera case, whereby the film may be temporarily removed from its operative position adjacent the exposure aperture without displacing it from its proper position for engagement with the actuating mechanism.

A detailed exposition of the preferred form of my invention will be found in the following specification, reference being made therein to the accompanying drawings illustrating it, in which.

In the drawings the numeral 10 designates a camera case, constructed of any suitable material, having front and rear doors 11 and 12, respectively, forming the front and rear walls thereof; and which doors may be suitably hinged, as at their bottoms, and provided with suitable catch means, for conveniently gaining access to the interior of the case. The case 10 is pivotally mounted in the usual fashion on standards 13; the usual hand crank 14 being provided for operating the film and shutter actuating mechanism. The standards 13 and the hand crank 14 are merely shown to illustrate the general arrangement, relative to my improvement; and as the film and shutter actuating mechanism, situated in the interior of the case 10, has nothing whatever to do with my invention, nor does not cooperate with it in accomplishing its results, therefore, such details have been purposely omitted from the case to avoid confusion in disclosing the real invention. Only so much of a motion picture camera, in its entirety, has been shown as is thought necessary to illustrate the function of the focusing device and the cooperative elements.

A partition 15, on which the bulk of the film and shutter actuating mechanism is mounted, extends transversely across the interior of the case 10, dividing it into a lens chamber 16 and a film chamber 17. A suitable lens housing 18, containing the usual lens organization, is rigidly mounted in the front door 11 and is positioned in co-axial alinement with the exposure aperture 19 in the partition 15. A suitable shutter 20 is revolubly mounted on the partition 15, to rotate intermediate the lens housing 18 and exposure aperture 19, to intermittently expose the object through the aperture 19, in the manner well known in the art.

Figure 2:
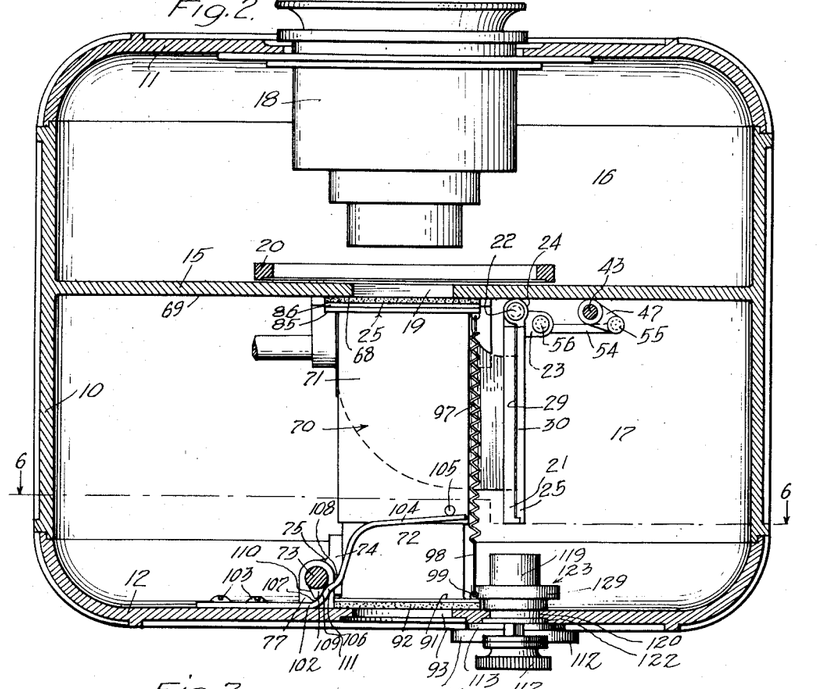
Fig. 2 is a sectional plan view of the same, taken as indicated by the line 2—2 of Fig. 1, and showing my focusing device in operative position therein.
Figure 3:
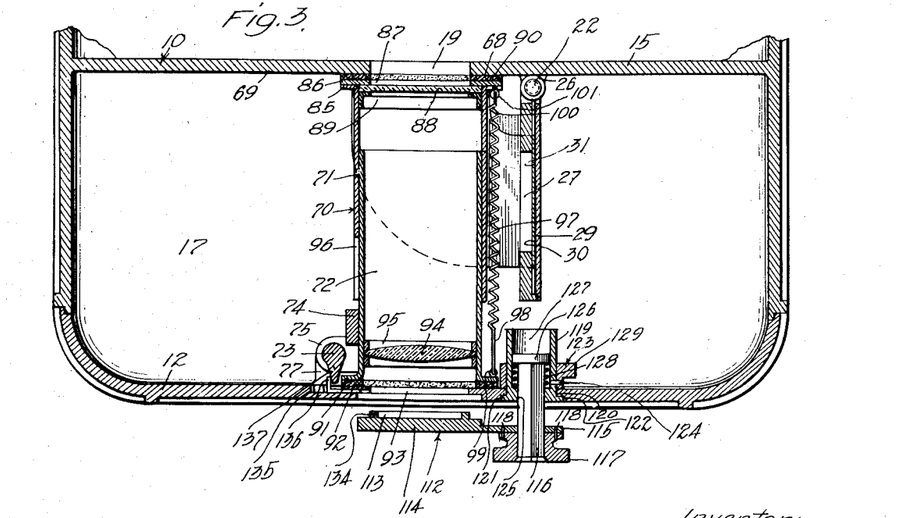
Fig. 3 is a fragmentary view, similar to Fig. 2, showing the focusing tube in section, as indicated by the line 3—3 of Fig. 6.
Figure 4:
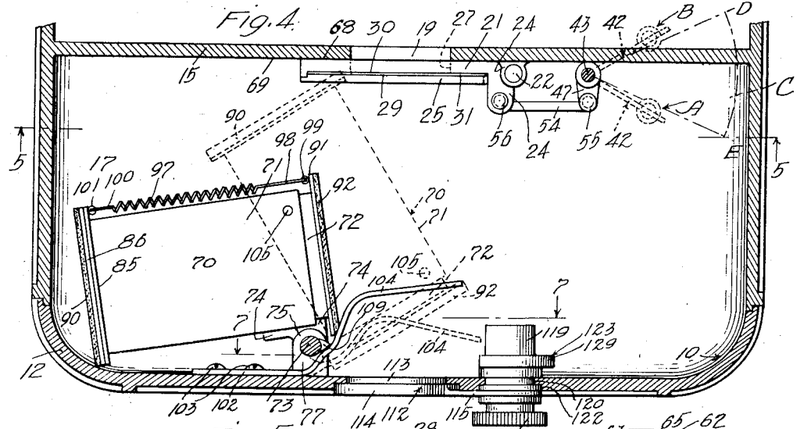
Fig. 4 is a fragmentary sectional view, similar to Fig. 2, and showing the focusing tube in inoperative position.
Figure 5:
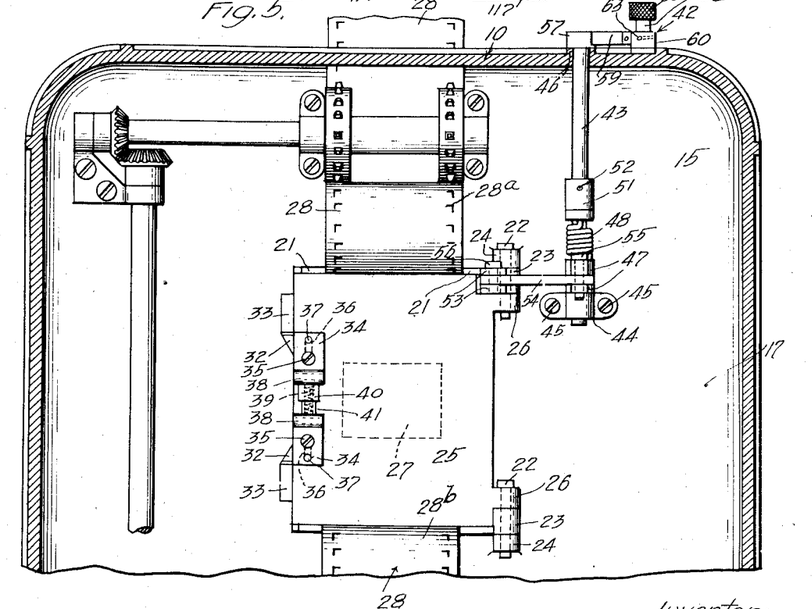
Fig. 5 is a fragmentary sectional elevation, taken as indicated by the line 5—5 of Fig. 4, showing the arrangement of the aperture gate and raceway and the mechanism for actuating them from the exterior of the camera case.

A film raceway 21, of any preferred design, is hingedly mounted on the partition 15, by means of hinge pins 22 passing through hinge bearings 23, on the raceway, and hinge bearing lugs 24 on the partition 15, in the manner clearly shown in Fig. 5. An aperture gate 25 is likewise hingedly mounted on the partition 15 by means of the hinge pins 22 passing through hinge bearings 26 thereon; the hinge bearings 23 of the raceway 21 being supported between the lugs 24, and the hinge bearings 26 of the gate 25 supported between the hinge bearings 23 with the pins 22 passing through co-axial bores in each one of them, thereby permitting the raceway 21 and the gate 25 to swing relative to the partition 15, and the said raceway and gate to swing relatively to and independently of each other. The raceway 21 is mounted to abut flat against the partition 15, when in closed or operative position, as shown in Figs. 4 and 5, and it has an exposure aperture 27 in its center, adapted to register with the aperture 19 when in this position. The gate 25 is adapted to swing open relative to the raceway 21, to permit the adjustment of the film 28 between them; and when it is in its closed or operative position, relative to the raceway 21, as shown in Figs. 2, 3, 4 and 5, its inner face 29, is slightly spaced from the outer face 30, of the raceway leaving a space 31 through which the film 28 passes in its travel past the exposure aperture 27. The gate is made to swing open relative to the raceway, to admit of the adjustment of the film in the space 31; and the raceway, carrying the gate, is adapted to swing back and away from the aperture 19, in the partition 15, to permit the adjustment of the focusing device to operative position, as shown in Figs. 2 and 3, and which will be more fully hereinafter explained.

Any suitable form of catch means may be utilized for securing the gate 25 in closed position against the raceway 21, as shown in Fig. 5; the form of latch here shown consisting of a pair of oppositely slidable detents 32 engaging notches in the opposed faces of a pair of lugs 33 on the raceway 21. These detents are slidably mounted on the gate 25 by means of plates 34 through which pass securing screws 35 screwthreadedly engaging the gate. The detents 32 are longitudinally slotted, as at 36, the screws 35 extending through these slots; and also pins 37 mounted in the gate, likewise extend through them for maintaining their alinement. Thumb lugs 38, preferably formed integral with the detents 32, extend upwardly therefrom at their adjacent edges, by means of which the detents 32 are moved toward each other to cause their disengagement with the lugs 33; and they are held normally separated, or in a position to engage the said lugs, by means of a small expansile wire spring 39 encased in telescoping tubes 40 and 41 mounted on the inner adjacent faces of the lugs 38.

Figure 9:
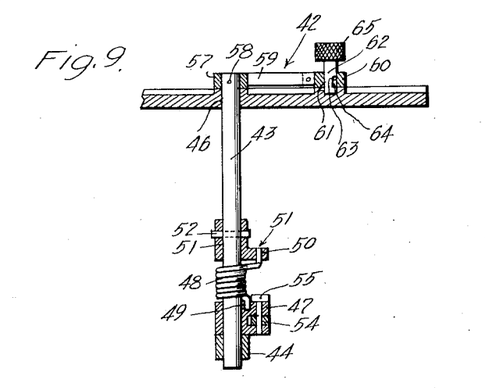
Fig. 9 is a sectional elevation, showing in detail the construction of the actuating mechanism for the raceway and aperture gate.

The raceway 21, together with the aperture gate 25, with the film 28 carried in the space 31 therebetween, is adapted to be opened away from the aperture 19 in the partition 15, that is, from the positions shown in Figs. 4 and 5, to the positions shown in Figs. 2 and 3, from the exterior of the camera case 10 by means of a hand lever 42 mounted upon the top of a vertically disposed shaft 43, the details of which are clearly shown in Figs. 5 and 9. The shaft 43 is revolubly journaled in a bearing 44, secured to the partition 15 by means of screws 45, or in any other suitable manner, and in a bearing 46 formed by an aperture in the top of the case 10. The shaft 43 is operatively connected with the raceway 21, by means of a bifurcated arm 47 loosely mounted thereon adjacent its lower end, and resting upon the upper face of the bearing 44, the arm 47 being connected to the shaft 43 through the medium of a helical spring 48, surrounding the shaft 43, one end of which extends into a bore 49 in the upper face of the arm 47 and the opposite end extending into a bore 50 in an arm 51, likewise mounted upon the shaft 43 and keyed thereto by means of a pin 52; the arm 47 connecting with a similarly bifurcated arm 53, preferably formed integral with the raceway 21, by means of a link 54. The link 54 is pivotally secured to the bifurcated arms 47 and 53, by means of pins 55 and 56, respectively.

The hand lever 42 comprises a hub or bearing portion 57, engaging the upper end of the shaft 43, which portion is keyed to the shaft by means of a pin 58; and an arm portion 59 terminating in a collar bearing 60. The collar bearing 60 has a vertically disposed bore 61 in which a pin 62 is slidably mounted; this pin 62 being retained within the bore by means of a small pin 63 extending transversely through the collar 60, or at right angles to the axis of the bore 61, and passing through an elongate recess 64 cut in the side of the pin 62. The pin 62 has a knurled head 65 by which it is grasped by the fingers and moved vertically in the bore 61 to effect its engagement and disengagement with locking recesses 66 and 67 in the top of the case 10.

Thus it will be apparent that movement of the hand lever 42 from the position A to the position B, shown in dot-dash lines in Fig. 4, will effect the opening or movement of the raceway 21, and the gate 25, from the positions shown in Figs. 4 and 5 to those shown in Figs. 2 and 3. Figs. 2 and 3 illustrate clearly the manner in which the film 28 is carried away from the aperture 19 between the raceway 21 and the gate 25, when the latter are in their open position, and which permits the adjustment of the focusing device to its operative position adjacent the aperture 19. The loops 28$^a$ and 28$^b$, in the film, above and below the raceway 21, are always left by the operator, in adjusting his film to the machine, to prevent tearing of the latter due to inaccuracies of movement of the actuating parts, and these loops permit the opening of the raceway, as above described, for the use of my focusing device.

The object of loosely mounting the lever arm 47 on the shaft 43, and connecting it therewith through the medium of the spring 48 and the arm 51, is to provide an efficient means whereby the raceway 21 may be securely held in either open or closed position, and under a slight pressure to prevent vibration during operation of the camera. This is accomplished by placing the locking recesses 66 and 67 a distance apart slightly greater than the arc of throw of the arm 42, in moving the raceway 21 from its extreme closed position, adjacent the partition 15, to its extreme open position, as shown in Fig. 2, (this arc being represented by the line C, between the lines D and E, in Fig. 4, the latter representing the normal limits of throw), so that in moving the lever 42 to the point of registration with either of the apertures 66 or 67, the spring 48 will be put under tension, in the case of moving the pin 62 to register with the recess 67, and will be put under compression when moved into registration with the recess 66, and the raceway 21 held under a yielding pressure in either its open or its closed position. This construction positively insures close contact between the inner face 68 of the raceway 21 and the face 69 of the partition 15, adjacent the aperture 19, and also insures the raceway 21 being held rigidly in open position and obviates all possibility of vibration. It may be here noted that the opening movement of the raceway is limited by the link 54 contacting with the sleeve bearing of the arm 47.

My improved focusing device comprises essentially a telescoping focusing tube 70, consisting of an upper or telescoping portion 71 and a lower or base portion 72, pivotally mounted on the interior of the case 10 in the film chamber 17, and on the rear door 12 thereof. The tube is operatively mounted upon a vertically disposed shaft 73 by means of a bearing block 74, the latter secured adjacent the bottom of one side of the base portion 72, and having co-axially bored bearing lugs 75 through which the said shaft 73 extends. The bearings 75 are keyed to the shaft 73 by means of pins 76, so the tube 70 will move with it, and the shaft is revolubly mounted in bearings 77 rigidly mounted on the rear door 12.

The shaft 73 has a beveled gear 80 keyed to its upper end, and meshing with a similar gear 81 mounted on the inner end of a stub shaft 82 extending through and revolubly journaled in a suitable bearing in the rear door 12. The stub-shaft 82 has a thumb lever 83, keyed to its outer end by means of a pin 84, and by which lever the shaft 82 is rotated or oscillated to transmit a similar motion to the shaft 73 on the interior of the case. It is by the lever 83 that the focusing tube 70 is moved into and out of operative position, the details of which will be later given.

The focusing tube 70 may be of any suitable cross sectional configuration, such as circular, or rectangular as here shown; and the members 71 and 72 may telescope in any suitable manner so long as they are relatively slidable, the form here shown, however, being preferable.

The telescoping portion 71 has an outturned flange 85 around its upper edge, and a plate 86, having an aperture 87 corresponding in size and configuration to the aperture 19, is secured to the flange 85 by any suitable means. A ground glass 88 is inserted in the interior of the tube adjacent the plates 86, and is securely held in this position by means of an angular plate 89, also secured to the portion 71. To secure a light-tight juncture between the end of the telescoping portion 71 and the face 69 of the partition 15, around the aperture 19, and also to compensate for slight inaccuracy of movement, a pad 90, of felt or any suitable light material, is secured to the outer face of the plate 86 around the aperture 87.

In a like manner the lower end of the tubular base portion 72 is out turned to form a flange 91, to which flange a pad 92, similar to the pad 90, is secured for forming close contact with the inner face of the rear door 12. The base portion 72 is open at both ends, the lower open end being adapted to register with a peep-hole 93, in the rear door 12, when the tube 70 is in operative position, and as clearly shown in Fig. 3. A magnifying glass 94 is mounted preferably adjacent the lower open end of the base portion 72, and is retained in position by means of plates 95 suitably secured to the inner walls of the portion 72; this being for the purpose of magnifying the image on the ground glass 88, to more clearly observe its details.

The telescoping portion 71 is cut away, as at 96, to admit of it moving downward over the base portion 72 without striking the brackets 74; and it is normally held downward on the base portion 72, by means of a spiral spring 97, having its lower end 98 secured to a small ring 99 in the flange 91 of the base portion 72, and its upper end 100 likewise secured in a ring 101 attached to the upper flange 85 of the telescoping portion 71. This spring not only draws the telescoping portion 71 down upon the base portion 72, which assists in its movement into and out of operative positions, as will be hereinafter explained, but it also holds it on the base portion 72 in a manner to prevent vibration and rattling of the different elements, should they become loose by wear.

Figure 1:
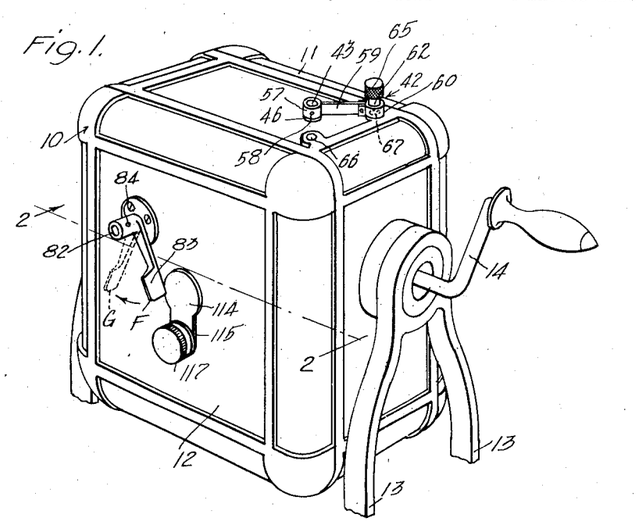
Fig. 1 is a perspective view of the exterior of a typical camera case, showing my invention as applied thereto and as it appears from the exterior thereof.

By movement of the lever 83 from the position F to the position G, Fig. 1, the stub-shaft 82 is partially rotated which rotation is transmitted to the shaft 73 through the medium of the gears 81 and 80, and such rotation of the shaft 73 moves the focusing tube 70 from its inoperative position, as shown in Fig. 4, to its operative position as shown in Figs. 2 and 3. It will be noted that while in its inoperative position, the telescoping member 71 is held downwardly over the base portion 72, by the contractile influence of the spring 97; the downward movement of the portion 71 being limited by the top edge of the base portion 72 striking the lower edge of the angular plate 89; and this contracted relation of these two elements permitting the tube 70 being swung into operative position, by rotation of the shaft 73, as shown in dotted lines in Fig. 4, after which the telescoping portion 71 is moved up and into contactual relation with the rear facing 59 of the partition 15, adjacent the aperture 19.

Figure 6:
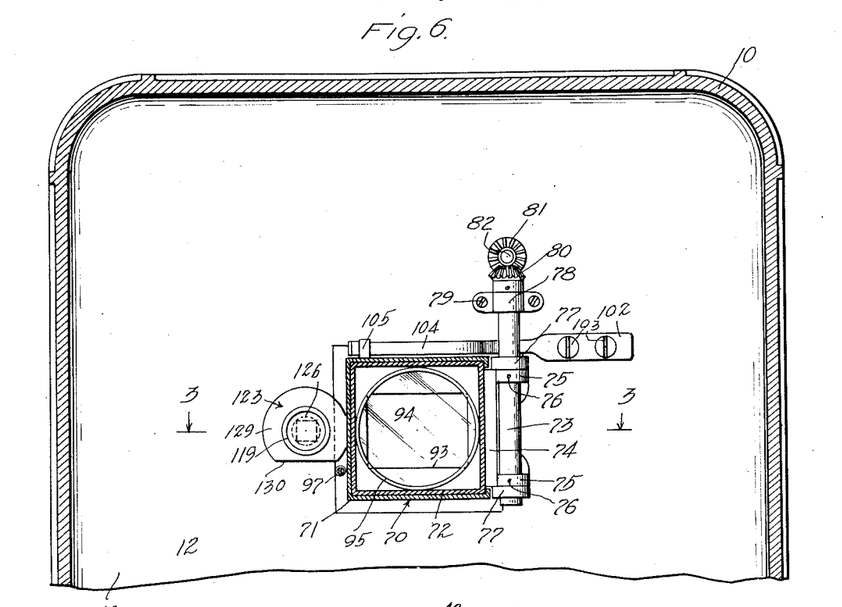
Fig. 6 is a sectional elevation showing the arrangement of the focusing tube on the rear wall of the camera case, and its adjustment in operative position, the view being taken as indicated by the line 6—6 of Fig. 2.

The means for accomplishing the movement of the telescoping portion 71 upwardly and into position adjacent the partition 15, after the tube 70 as a whole has almost reached its operative position, that is, in axial alignment with the lens housing 18, the exposure aperture 19, and the peep-hole 93, consists of a leaf spring 102 rigidly mounted on the inner face of the rear door 12, as by means of screws 103, and having an outwardly bent portion 104, adapted to contact with a small pin 105 adjacent the lower edge, and near one side, of the telescoping portion 71, as shown in Figs. 2, 4 and 6. This spring 102 extends from its point of attachment underneath the shaft 73, or between it and the inner face of the rear door 12, and is then bent outwardly at an obtuse angle with its base or attaching portion and is again bent at approximately, or slightly greater than, a right angle with the last mentioned angular portion. Adjacent its first angular bend the spring 102 has a reverse bend 106, which bend is positioned substantially radial with the shaft 73 and at an angle of approximately 45° off its lower vertical center, thus forming depressions 107 and 108 on either side of it. The upper face of the bend 106 is adapted to normally engage the periphery of the shaft 73, and is in turn engaged by a pointed lug 109, preferably formed integral with the shaft 73. This lug 109 is radial with the shaft 73, and is in effect a cam extending downwardly from the said shaft in plane parallel with the axis of the focusing tube 70.

In moving the tube 70 from its inoperative position, Fig. 4, to its operative position, Fig. 2, by rotation of the shaft 73 as hereinbefore stated, the cam lug 109, will move with the shaft 73 from the position shown in Fig. 4 to that shown in Fig. 5, and in its arc of rotation engage the bend 106, thereby depressing the outer end 104 of the spring, as shown in dotted lines in Fig. 4. The outer end 104 of the spring 102 is thus depressed or moved downwardly until the focusing tube 70 is moved to a position a little beyond that shown in dotted lines in Fig. 4, when the cam lug 109 will move into the depression 107, permitting the spring 102 to return to its normal position, or to that shown in Fig. 2. As the spring is thus returning to its normal position the focusing tube 70 is almost in axial alignment with the exposure aperture 19 and the peep-hole 93, at which time the end 104 moves into engagement with the pin 105, in the telescoping portion 71, thus moving the latter outwardly against the contraction of the spring 97, and into contact with the face 69 of the partition 15 as shown in Figs. 2 and 3. This means permits the tube 70 to be moved about its pivotal point from inoperative to operative position, during which time it must of necessity be of a total length less than the distance between the inner face of the rear door 12 and the face 69 of the partition 15, and which difference is compensated for by the movement of the telescoping portion 71 outwardly by the end 104 of the spring 102 contacting with the pin 105 in the said telescoping portion.

Attention is directed to the fact that not only does the cam lug 109 contacting with the bend 106 of the spring 102 function to depress the outer end 104, which permits movement of the tube 70 into practically operative position before the telescoping portion 71 is moved outwardly, but the depression 108 engaging the face 110 of the cam lug 109, serves to rigidly hold the tube 70 in inoperative position as shown in Fig. 4, and the depression 107 contacting with or engaging the opposite face 111 of the cam lug 109, serves to rigidly hold it in operative position, as shown in Fig. 2.

A cover 112 is provided for the peep-hole 93, the said cover being circular in configuration to conform to the circular configuration of the peep-hole 93, and it has an annular flange 113 adapted to extend into and seat in the peep-hole 93; the latter having an annular recess extending beyond its periphery, in which the body portion 114 of the cover 112 is adapted to seat. With this construction it is clear that the cover 112 will have to be axially moved out and away from the peep-hole 93 before it can be turned to uncover it, which will prevent the accidental dislodgment therefrom. The cover 112 has a radial arm 115 by which it is mounted upon a square post 116 and by which it is pivotally mounted. A knurled knob 117 is likewise mounted on the outer end of the post 116, by means of which the cover 112 is adapted to be operated, this knob being secured to the arm 115 by means of small pins 118; however, it is clear that these two may be formed integral if desired. The knob 117 may be secured rigidly to the outer end of the post 116 in any suitable manner.

The post 116 is mounted longitudinally or axially slidable in a cylindrical sleeve bearing 119, which is revolubly mounted in a circular bearing aperture 120 in the wall of the door 12. The sleeve bearing 119 has an annular flange 121 engaging an annular recess 122, surrounding the circular aperture 120, and this flange is held normally seated in the recess by means of a collar 123 surrounding the sleeve 119, on the opposite side of the wall, and secured thereto by means of a pin 124. In this manner the sleeve 119 is permitted to rotate in its bearing but is prevented from any axial displacement. The sleeve 119 is open at its inner end, its outer end being closed with the exception of a square aperture 125 in which the post 116 is slidably mounted; the latter having a disk 126, rigidly secured to its inner end, and adapted to slidingly engage the bore 127 therein. The cover 112 is held normally seated in the peep-hole 93, or held inwardly against the outer face of the rear door 12 when in open position, by means of an expansile coil spring 128 confined between the disk 126 and the closed end of the sleeve 119.

The collar 123 has an outwardly extending annular flange 129 around its outer end and spaced a short distance from the inner face of the rear door 12; this flange extending almost entirely around the sleeve and terminating in a straight or flat chordal portion 130; the flange 129 being adapted to extend over and engage the outwardly extending flange 91, of the base portion 72, when the latter is in its operative position, and when the cover 112 is raised from the peep-hole 93 and rotated about its pivotal point. The flange 129 engaging the flange 91 positively prevents the focusing tube 70 from being moved from its operative position, as shown in Figs. 2 and 3, when the cover 112 is not seated over the peep-hole 93. It may be here noted that the post 116 being square, and extending through the square aperture 125 in the bearing sleeve 119, rotation of the post 116 to move the cover 112 away from the peep hole 93, will rotate the sleeve bearing 119 and also the collar 123, carrying flange 129; and as the chordal portion 130 is normally adjacent the operative position of the tube 70 when the cover 112 is seated in the peep-hole 93, as shown in Fig. 7, rotation of the post 116 will cause the flange 129 to ride over the flange 91 and prevent movement of the focusing tube out of operative position.

Figure 7:
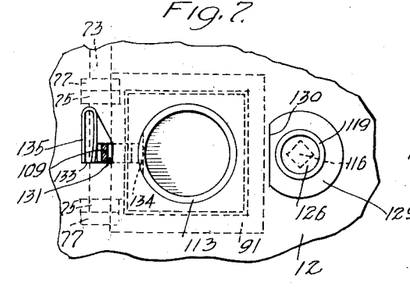
Fig. 7 is a fragmentary plan view of the locking device for the peep-hole cover, taken as indicated by the line 7—7 of Fig. 4, and showing the device in unlocked position.
Figure 8:
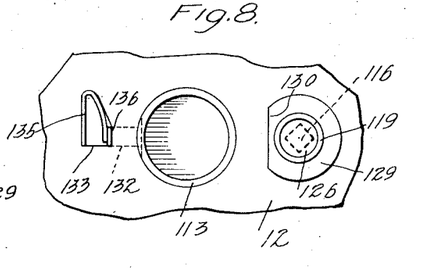
Fig. 8 is a view similar to Fig. 7, showing the locking device in locked position.

In order to insure the retention of the cover 112 in the peep-hole 93, at all times when the focusing tube 70 is not in operative position, and to obviate the possibility of light entering the film chamber 17, when the tube is not in such position, a suitable locking means is provided for the cover 112, consisting of a detent 131 slidably mounted in a slot 132, in the rear door 12, the slot extending from the periphery of the peep-hole 93 to a recess 133, as clearly shown in Figs. 7 and 8. The detent 131 is held normally extended through the slot 132 and into the peep-hole 93, in a position to engage a notch 134 in the annular flange 113 of the cover, by means of a leaf spring 135 confined within the recess 133, one end of which presses against one side of the recess and the opposite end engaging an upturned or angular portion 136 of the detent 131.

As above stated, the detent 131 is normally held outward in the position shown in Fig. 8; and when the cover 112 is seated in the peep-hole 93 and the focusing tube 70 is moved out of its operative position and toward or in its inoperative position the detent 131 will engage the notch 134 in the flange 113, thus preventing the removal of the cover from its seat at all times while the focusing tube 70 is out of its operative position. In order that the cover 112 may be released to be unseated while the focusing tube 70 is in operative position, a lug 137 is provided on the shaft 73, intermediate its bearings, and in a position to engage the upturned portion 136 of the detent 131, and move it backward, or out of engagement with the slot 134 when the focusing tube is in operative position. The lug 137 is preferably formed integral with the shaft 73, and extends in the same plane as the cam lug 109, that is, parallel with the axis of the focusing tube 70, as clearly illustrated in Fig. 3. The lug 137 is so mounted on the shaft 73 that it will engage the portion 136 and withdraw the detent 131 from the slot 134 only when the focusing tube 70 has reached fully its operative position, and not before. The engagement of the portion 136 by the lug 137 moves it backward against the pressure of the spring 135, which spring, as soon as the focusing tube 70 is again moved from its operative position, will force the detent into position to engage the slot 134, thus locking the cover against movement.

The mode of operation of my device is as follows:

Assuming the film 28 to be properly threaded into the camera and already for operation, or the camera having been operated, assuming that the operator desires to observe the effect of the lighting that is being impressed upon the film, it is only necessary for him to move the hand lever 42 from the position A to the position B, shown in dot-dash lines in Fig. 4, that is from the locking recess 66 to the locking recess 67, thereby moving the raceway 21 and the aperture gate 25, with the film 28 therebetween, from the position shown in Figs. 4 and 5, to the positions shown in Figs. 2 and 3, leaving the way clear for the operation of the focusing tube 70. He then moves the hand lever 83 from the position F to the position G, shown in dot-dash lines in Fig. 1, which movement rotates the shaft 73, through the medium of shaft 82, and bevel gears 81 and 80, thereby moving the focusing tube from its inoperative position, as shown in Fig. 4, to its operative position as shown in Figs. 2, 3 and 6. Movement of the focusing tube from its inoperative to its operative position, withdraws the detent 131, from the slot 134 in the cover 112 by the lug 137 contacting with the portion 136, after which the cover 112 may be unseated and moved away from the peep-hole 93, as and in the manner hereinbefore stated. During the time the focusing tube is in operative position, and during the time the cover 112 is unseated from the peep-hole 93, the flange 129 is engaging the flange 91 on the bottom of the base member 72, thereby preventing its movement out of operative position during the time the peep-hole is uncovered. Having observed the object on the ground glass 88, the operator then by grasping the knob 117, rotates the post 116 to again seat the cover 112 in the peep-hole 93, thereby bringing the chordal portion 130 parallel with the flanged edge of the base portion 72, and cover 112 being seated, the focusing tube is then ready to be returned to its inoperative position. Movement of the lever 83 from the position G back to the position F, Fig. 1, moves the focusing tube 70 from its operative to its inoperative position, thereby releasing the detent 131, by movement of the lug 137 away from the portion 136, which is then moved into engagement with the slot 134 in the flange 113 by the action of leaf spring 135. After movement of the tube 70 to its inoperative position the race-way and gate are then closed by movement of the lever 42 from the position A to the position B, Fig. 4.

While I have here shown and described the preferred embodiment of my invention, it is nevertheless understood that I reserve the right to make any changes or modifications in structure, which properly come within the scope of the appended claims.

As between this application and the copending one referred to, this application carries claims to the specific structure herein set out; while the other carries the claims that are generic to both structures.

Having described a preferred form of my invention, I claim:

1. The combination with a camera of a telescoping focusing tube pivotally mounted within the camera case, and means to move said tube in and out of operative position.

2. The combination with a camera case having an exposure aperture and a peep hole through which the aperture may be viewed, of a focusing tube pivotally mounted between said aperture and said peep hole, and means to move said tube in and out of alignment therewith.

3. The combination with a camera case having an exposure aperture and a peep hole in axial alignment, of a telescoping focusing tube pivotally mounted between said aperture and said peep hole, and means to move said tube in and out of alignment therewith, said means being operable from the exterior of the case.

4. The combination with a camera case having an exposure aperture and a peep hole in axial alignment, of a telescoping focusing tube pivotally mounted between said aperture and said peed hole, a cover for the peep hole, means to move said tube in and out of alignment with said aperture and said peep hole, and means in connection with said tube moving means to prevent removal of the peep hole cover when the said tube is not in alignment with the aperture and peep hole.

5. The combination with a camera case having an exposure aperture and a peep hole in axial alignment, of a telescoping focusing tube pivotally mounted to move to and from position between said aperture and said peep hole, a cover for the peep hole, means to move said tube in and out of alignment with said aperture and said peep hole, and means in connection with said tube moving means and the peep hole cover to prevent removal of the peep hole cover when the tube is not in alignment with the aperture and peep hole, and to prevent moving of the tube out of alignment with said aperture and said peep hole while the cover is removed.

6. The combination with a camera case having an exposure aperture and a peep hole in axial alignment, a focusing tube pivotally mounted to move between the exposure aperture and said peep hole, a ground glass in said tube, and means to move said tube in and out of alignment with said aperture and said peep hole.

7. The combination with a camera case having a central partition, of an exposure aperture in the partition; a peep hole in one wall of the case in axial alignment with said aperture; a telescoping focusing tube pivotally mounted within the case; means to move said tube in and out of alignment with said aperture and said peep hole; and means to telescopically extend said tube, in alignment with the aperture and the peep hole, to form a light tight connection therebetween.

8. The combination with a camera case having an interior partition, of an exposure aperture in the partition; a peep hole in one wall of the case in axial alignment with said aperture; a cover for the peep hole; a telescoping focusing tube pivotally mounted within the case; means to move said tube in and out of alignment with said aperture and said peep hole; means to telescopically extend said tube, in alignment with the aperture and the peep hole, to form a light tight connection therebetween, and means to prevent removal of the peep hole cover when the tube is not in alignment with the said aperture and said peep hole.

9. The combination with a camera case of the class described having an interior partition, of an exposure aperture in the partition, a film raceway pivotally mounted adjacent said aperture, means to move said raceway in and out of operative relation to said aperture, a peep hole in one wall of the case in axial alignment with said aperture, a telescoping focusing tube pivotally mounted within the case, and means to move said tube in and out of alignment with said aperture and said peep hole.

10. The combination with a camera case of the class described having an interior partition, of an exposure aperture in the partition, a film raceway pivotally mounted adjacent said aperture, means operative from the exterior of the case to move said raceway in and out of operative relation to said aperture, a peep hole in one wall of the case in axial alignment with said aperture, a cover for said peep hole, a telescoping focusing tube pivotally mounted within the case, means operative from the exterior of the case to move said tube in and out of alignment with said operative and said peep hole, means to telescopically extend said tube in alignment with said aperture and peep hole to form a light tight connection therebetween, means to prevent removal of the peep hole cover when the tube is not in alignment with the aperture and peep hole, and means to prevent removal of the tube from alignment with said aperture and said peep hole while said cover is removed from the hole.

11. In combination with a camera case having an exposure aperture and a peep hole, a tube pivotally mounted within the case and movable into and out of registry with the aperture and the peep hole, and means to prevent light entering the peep hole except when the tube is in its said registering position.

12. In combination with a camera case having an exposure aperture and a peep hole, a tube pivotally mounted within the case and movable into and out of registry with the aperture and the peep hole, said tube being telescopic, and means actuated by virtue of movement of the tube to its said registering position to extend the tube.

In witness that I claim the foregoing I have hereunto subscribed my name this 16th day of May, 1921.

LLOYD BROWN.

Witnesses:
GEO. A. ALTHOFF,
J. B. KENDALL.